United States Patent
Hildebrandt et al.

(10) Patent No.: US 7,232,373 B2
(45) Date of Patent: Jun. 19, 2007

(54) PLUNGING SIDESHAFT ASSEMBLY WITH JOINT

(75) Inventors: Wolfgang Hildebrandt, Siegburg (DE); Thomas Weckerling, Lohmar (DE); Stephan Maucher, Siegburg (DE); Michael Ricks, Nidderau (DE); Peter Bilz, Freigericht (DE); Kiyoshi Taniyama, Solihull (GB)

(73) Assignee: GKN Automotive GmbH (DE)

(*) Notice: Subject to any disclaimer, the term of this patent is extended or adjusted under 35 U.S.C. 154(b) by 0 days.

(21) Appl. No.: 11/482,223

(22) Filed: Jul. 7, 2006

(65) Prior Publication Data

US 2006/0252558 A1    Nov. 9, 2006

Related U.S. Application Data

(63) Continuation of application No. 10/695,058, filed on Oct. 28, 2003, now abandoned.

(30) Foreign Application Priority Data

Oct. 30, 2002  (DE) ................. 102 50 419

(51) Int. Cl.
    *F16D 3/223* (2006.01)
(52) U.S. Cl. ................... 464/144; 464/167
(58) Field of Classification Search ............... 464/140, 464/144, 167, 906
    See application file for complete search history.

(56) References Cited

U.S. PATENT DOCUMENTS

| | | | |
|---|---|---|---|
| 2,322,570 A | * | 6/1943 | Dodge ................ 464/144 |
| 3,370,441 A | * | 2/1968 | Aucktor ............... 464/144 |
| 3,633,382 A | * | 1/1972 | Westercamp ........... 464/144 |
| 4,791,269 A | | 12/1988 | McLean et al. |
| 5,292,285 A | | 3/1994 | Ingalsbe et al. |
| 5,647,800 A | | 7/1997 | Warnke et al. |
| 5,651,738 A | | 7/1997 | Jacob et al. |
| 5,813,917 A | | 9/1998 | Wakamatsu et al. |
| 6,217,456 B1 | | 4/2001 | Jacob |
| 6,306,045 B1 | | 10/2001 | Jacob |
| 6,390,928 B1 | | 5/2002 | Welschof et al. |
| 6,468,164 B2 | | 10/2002 | Song |

FOREIGN PATENT DOCUMENTS

DE   42 28 230 A1   3/1993
GB   2 319 584 A    5/1998

OTHER PUBLICATIONS

GKN Constant Velocity Product Catalog, GKN Automotive Inc., Auburn Hills, MI, pp. 3, 13 & 16, 1993, 464/906.

* cited by examiner

*Primary Examiner*—Greg Binda

(57) ABSTRACT

A driveshaft assembly having two CV joints and an intermediate shaft. One of the CV joints (11) includes an outer joint part (12) with first ball tracks (14), an inner joint part (17) with second ball tracks (18), and balls (19) held in a common plane by a cage (20). First and second angles of intersection of the ball tracks (14, 18) of a pair of tracks are identical in size and are positioned symmetrically relative to the joint axis. The ball cage (20) is axially fixed in the constant velocity joint. The intermediate shaft includes a longitudinal plunging unit (41) having a sleeve (42) with first ball grooves (43) which extend axially, a journal (44) with second ball grooves (45) which extend axially, balls (46) which are held in a cage (47) in groups in pairs of the first and second ball grooves (43, 45).

5 Claims, 8 Drawing Sheets

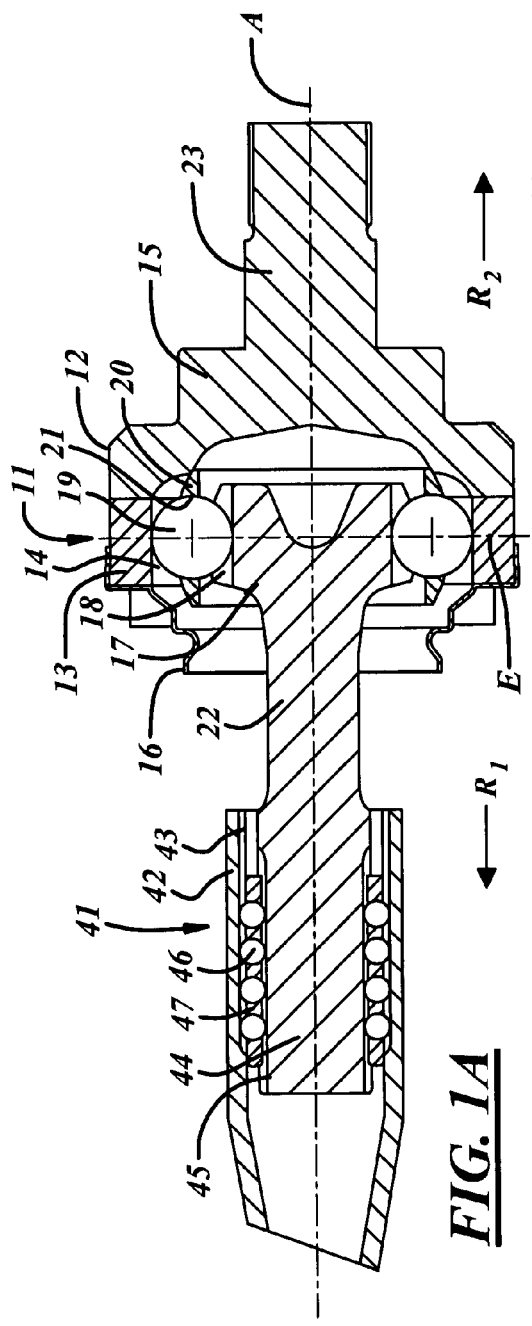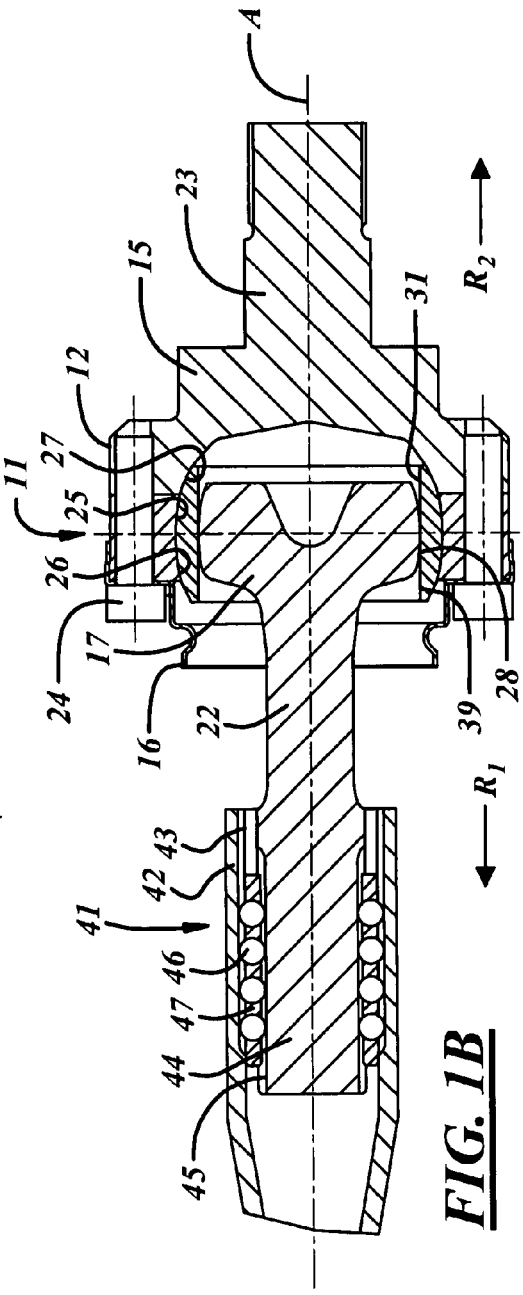
*FIG. 1A*
*FIG. 1B*

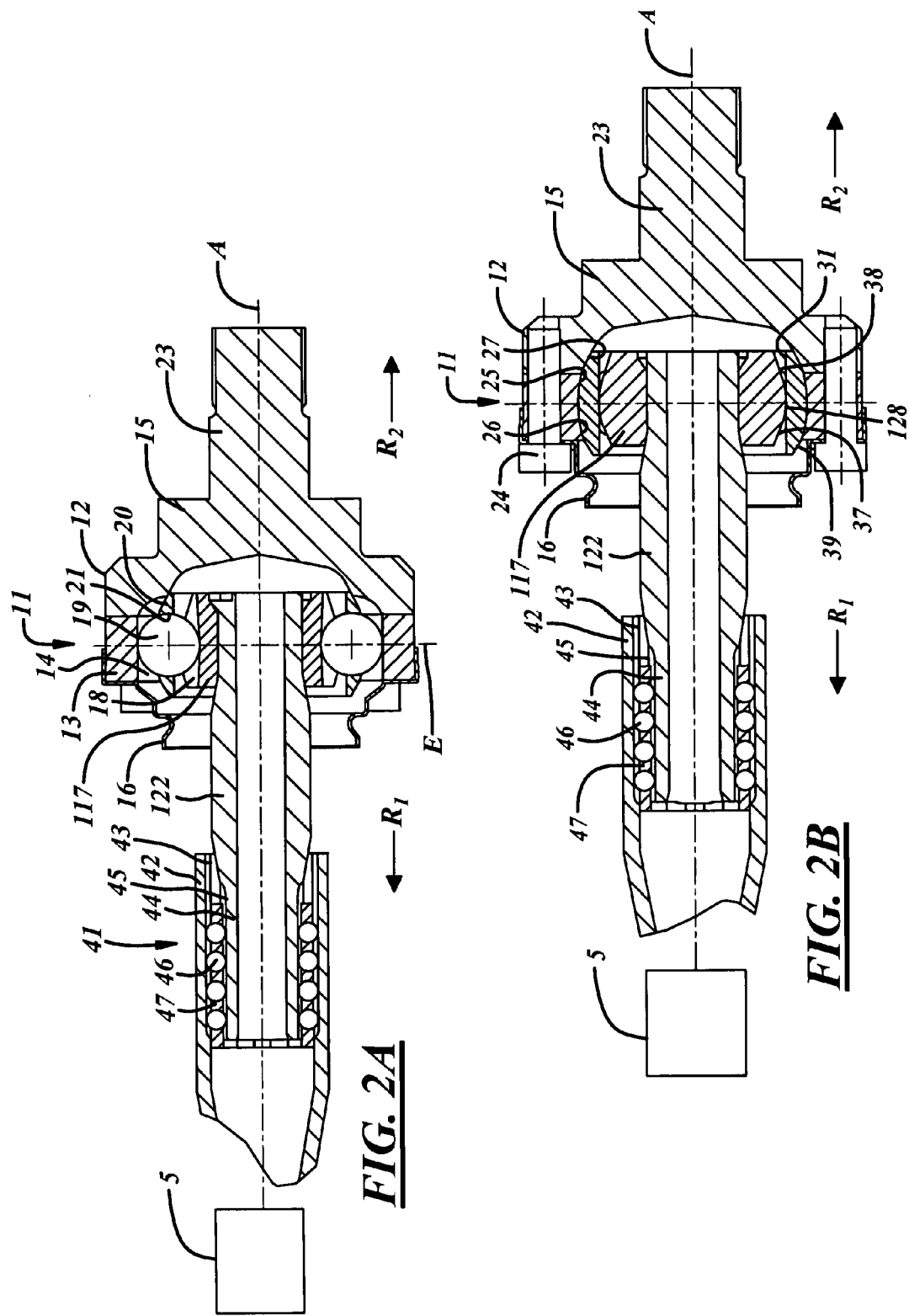

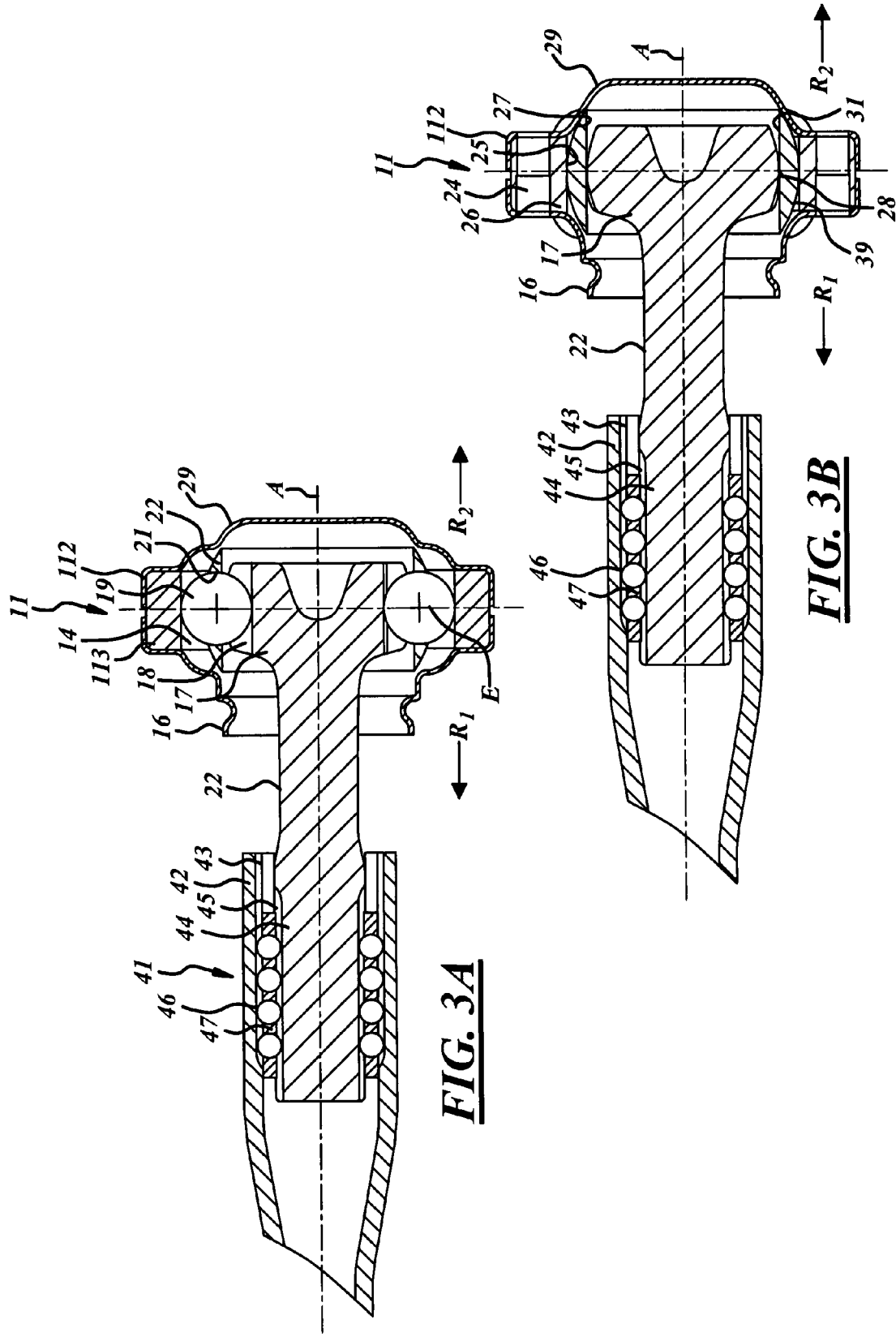

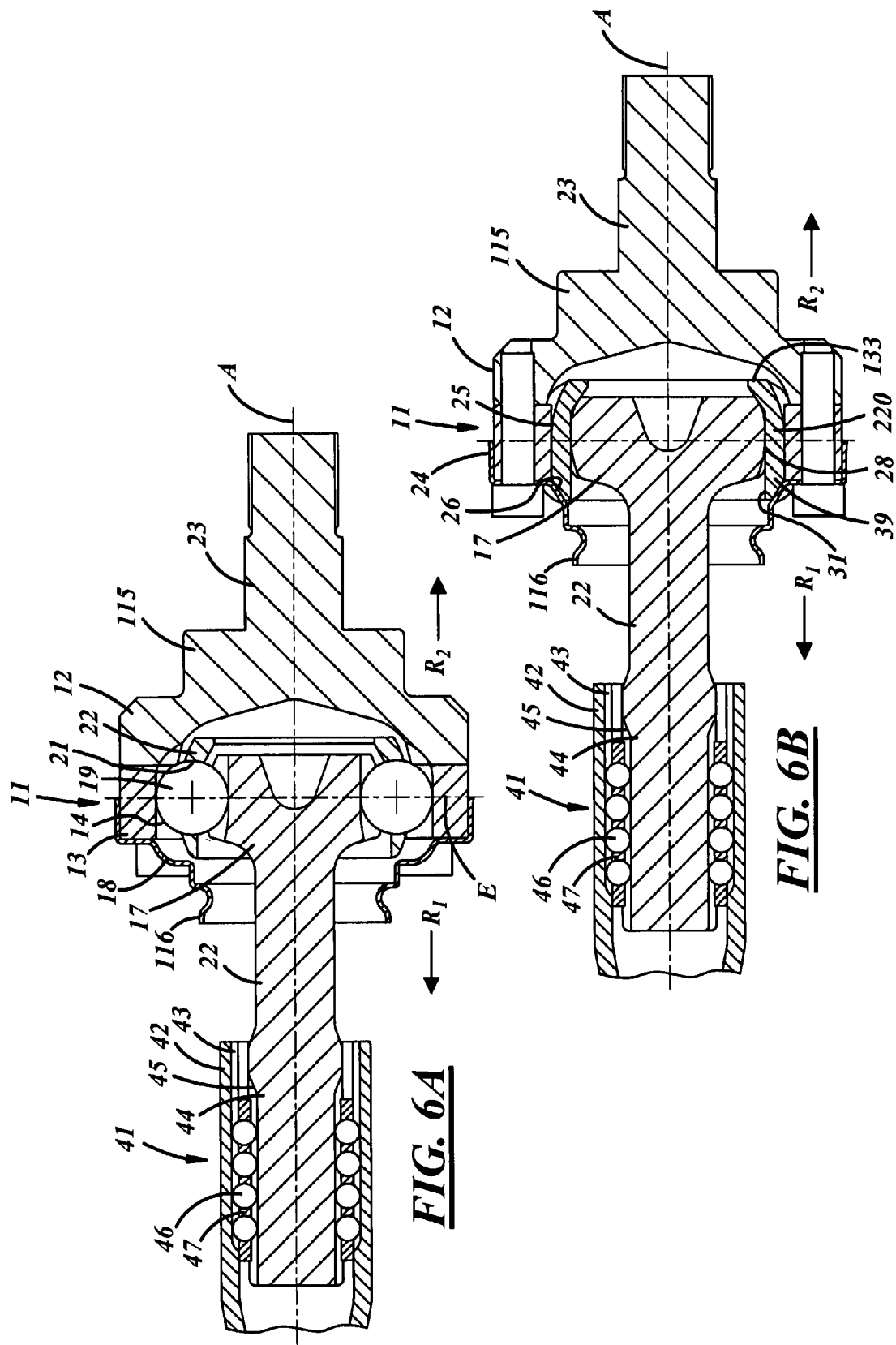

US 7,232,373 B2

PLUNGING SIDESHAFT ASSEMBLY WITH JOINT

CROSS-REFERENCE TO RELATED APPLICATION

This application is a Continuation of U.S. patent application Ser. No. 10/695,058 entitled "Plunging Sideshaft Assembly With VL Joint" filed on Oct. 28, 2003 now abandoned.

BACKGROUND OF THE INVENTION

The invention relates to a driveshaft and, more particularly, concerns a sideshaft in a motor vehicle having two constant velocity universal joints and an intermediate shaft. The intermediate shaft comprises a longitudinal plunging unit including a sleeve with first ball grooves which extend axially, a journal with second ball grooves which extend axially, balls which are held in groups in pairs of grooves each comprising a first ball groove and a second ball groove, and a cage which holds the balls at a fixed distance from one another. The primary requirements for such sideshafts are easy plungeability, easy assembly and handling, and a quiet and long service life. The present invention is directed towards an improved plunging sideshaft assembly.

SUMMARY OF THE INVENTION

The invention provides a driveshaft, such as a sideshaft in a motor vehicle, which comprises two fixed joints and a longitudinal plunging unit integrated into the intermediate shaft. At least one of the fixed joints, more particularly, the sideshaft joint at the differential end, is made to be particularly small and easy to assemble. According to one solution, one of the constant velocity universal joints comprises an outer joint part with first ball tracks which form a first angle of intersection with the joint axis, an inner joint part with second ball tracks which form a second angle of intersection with the joint axis, balls which run in pairs of tracks consisting of a first ball track and a second ball track, and a cage which holds the balls in a common plane, wherein the first and second angles of intersection of the ball tracks of a pair of tracks are identical in size and are positioned symmetrically relative to the joint axis and wherein the ball cage is axially fixed in the constant velocity joint.

In one embodiment, the ball cage comprises an inner cylindrical guiding face in which the inner joint part is held radially, and a spherical outer face which is held axially and radially between two annular stop faces.

In a second embodiment, the fixed joint includes a ball cage having an inner cylindrical guiding face in which the inner joint part is held radially, and a spherical outer face which is held radially in an inner cylindrical guiding face of the outer joint part. The ball cage is supported in a first direction on a first annular stop face in the outer joint part, and the inner joint part is supported in a second axial direction on a second annular stop face in the ball cage.

In a third embodiment, the fixed joint includes a ball cage including an inner cylindrical guiding face in which the inner joint part is held, and a spherical outer face which is radially held in an inner cylindrical guiding face of the outer joint part. The inner joint part is supported in a first axial direction on an annular stop face in the ball cage, and in a second axial direction, it is supported on a radial end face of the outer joint part.

The inventive fixed joints essentially correspond to a VL plunging joint with intersecting pairs of tracks, but as a result of suitable stop faces in the joint, the axial plunging ability of the cage relative to the inner joint part and outer joint part, and thus relative to the joint as a whole, is fixed. Joints of this type are very lightweight and have a small diameter relative to the torque transmitting capacity and are thus advantageous as far as production is concerned. To achieve the axial non-plungeability, in accordance with the first embodiment mentioned above, only the base part and the attaching cap part require slight modification relative to the configuration of a typical VL plunging joint. According to the second embodiment, it differs from a conventional VL plunging joint by modifications to the base part and the cage, and respectively, the cap part and the cage. Finally, according to the third embodiment, only slight modifications relative to typical VL joints have to be carried out on the cage and the inner joint part.

The solution in accordance with the various embodiments of the invention permits the production of lightweight, cost-effective shafts and, more particularly, sideshafts which, as a result of the integrated longitudinal plunging unit, feature low axial plunging forces and thus an advantageous NVH (noise-vibration-harshness) behavior.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIGS. 1 to 7, in seven different embodiments, show part of a driveshaft with a fixed joint and a longitudinal plunging unit in axial sections:

A) Through a plane which intersects two torque transmitting balls;

B) through a plane which is positioned between balls of the fixed joint.

Figure 2C:
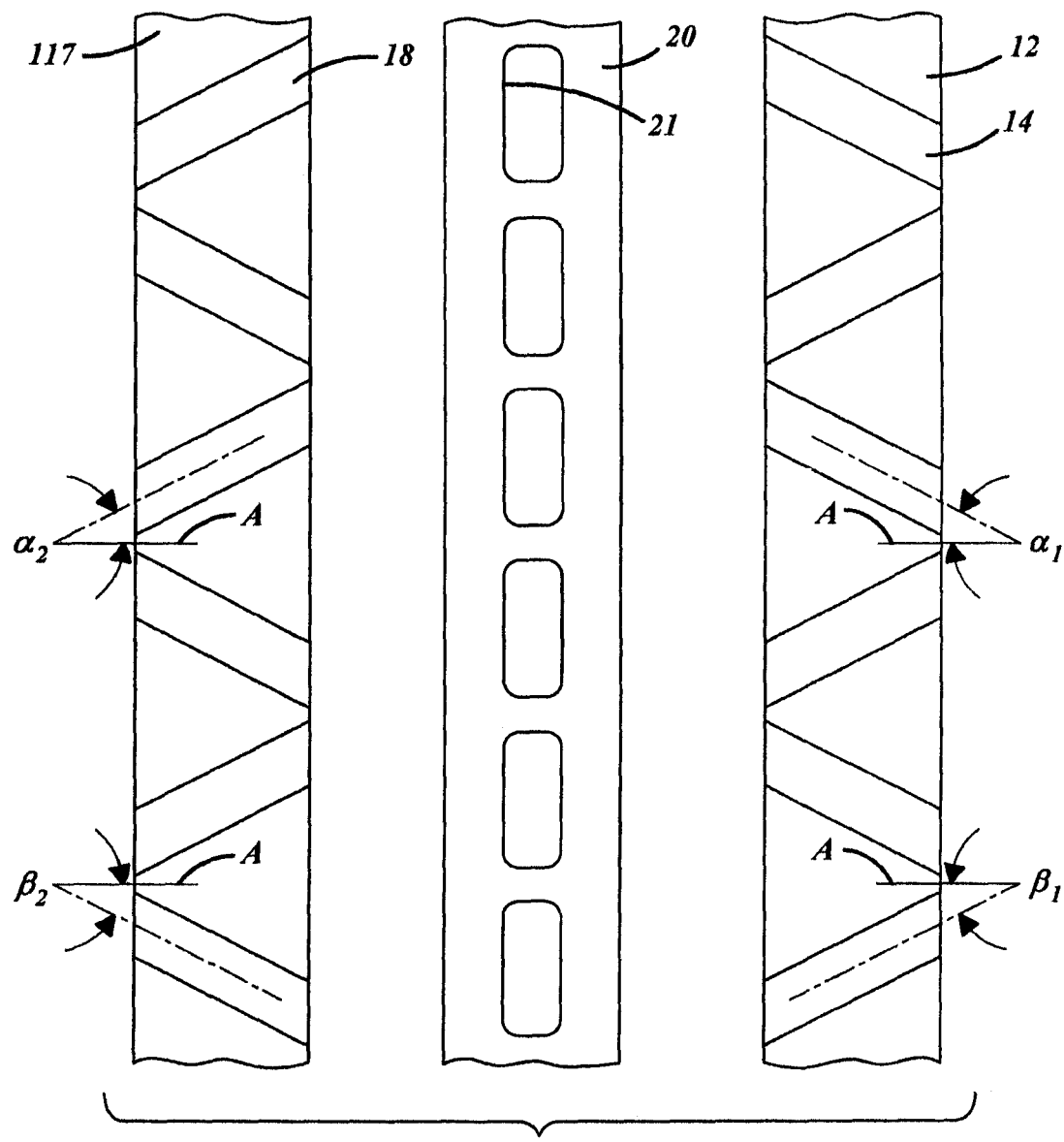

FIG. 2C shows a schematic illustration of the inner and outer joint part ball track relationships with respect to the joint axis.

FIG. 8 shows an inventive joint according to FIG. 3A in a partially dismantled condition:

A) In an axial view; and

B) in a longitudinal section through a plane B—B which intersects two balls.

DETAILED DESCRIPTION

The common characteristics of FIGS. 1 to 7 will first be described jointly. The figures each show a fixed joint 11 and a longitudinal plunging unit 41 forming part of an intermediate shaft. The fixed joint 11 comprises an outer joint part 12 having an annular member 13 containing first ball tracks 14, a base part 15 (FIGS. 1, 2, 6, and 7) and 29 (FIGS. 3, 4, 5) respectively, and an annular attaching cap 16. The attaching cap 16 can be made of plate metal and serves to fix a convoluted boot for sealing the joint. Furthermore, the joint comprises an inner joint part 17 with second ball tracks 18. Torque transmitting balls 19 are positioned in pairs of first ball tracks 14 and second ball tracks 18. The first ball tracks 14 form a first angle of intersection with the joint axis A, and the second ball tracks 18 form a second angle of intersection with the joint axis A. The first and second angles of intersection of the ball tracks 14, 18 of a pair of ball tracks are identical in size and are positioned symmetrically relative to the joint axis A. The balls 19 are held in a ball cage 20 which is provided with circumferentially distributed cage windows 21. The ball cage 20 holds the balls 19 in a common plane E and is axially fixed in the constant velocity joint 11. A shaft journal 22 is connected to the inner joint part 17.

The longitudinal plunging unit 41 comprises a sleeve 42 with first ball grooves 43, a journal 44 with second ball grooves 45, torque transmitting balls 46 running in pairs of first ball grooves 43 and second ball grooves 45, as well as a ball cage 47 which holds the balls at a constant distance from one another. The balls 46 are held in groups in pairs of the first and second ball grooves 43, 45. The journal 22 of the inner joint part is integral with the journal 44 of the axial plunging unit.

In FIG. 1, the base 15 is provided in the form of a solid component with an adjoining joint journal 23. The annular part 13, the base part 15 and the attaching cap 16 are threaded to one another by threaded fasteners 24. The inner joint part 17 is integrally connected to the shaft journal 22. In the cage 20, there is provided an inner cylindrical guiding face 31 in which the inner joint part 17 is held radially by way of a spherical outer face 28. In the annular part 13, there is formed an inner cylindrical guiding face 25 and first annular stop face 26 against which the cage 20 is supported by way of its spherical outer face 39 in a first axial direction R1. In the base part 15, there is formed a second annular stop face 27 which axially supports the cage 20 in a second axial direction R2. As the first ball tracks 14 and the second ball tracks 18 intersect one another in pairs in space, the axial fixing of the cage 20 in the outer joint part 12 also prevents the displacement of the inner joint part 17 relative to the cage 20.

Figures 4A, 4B:
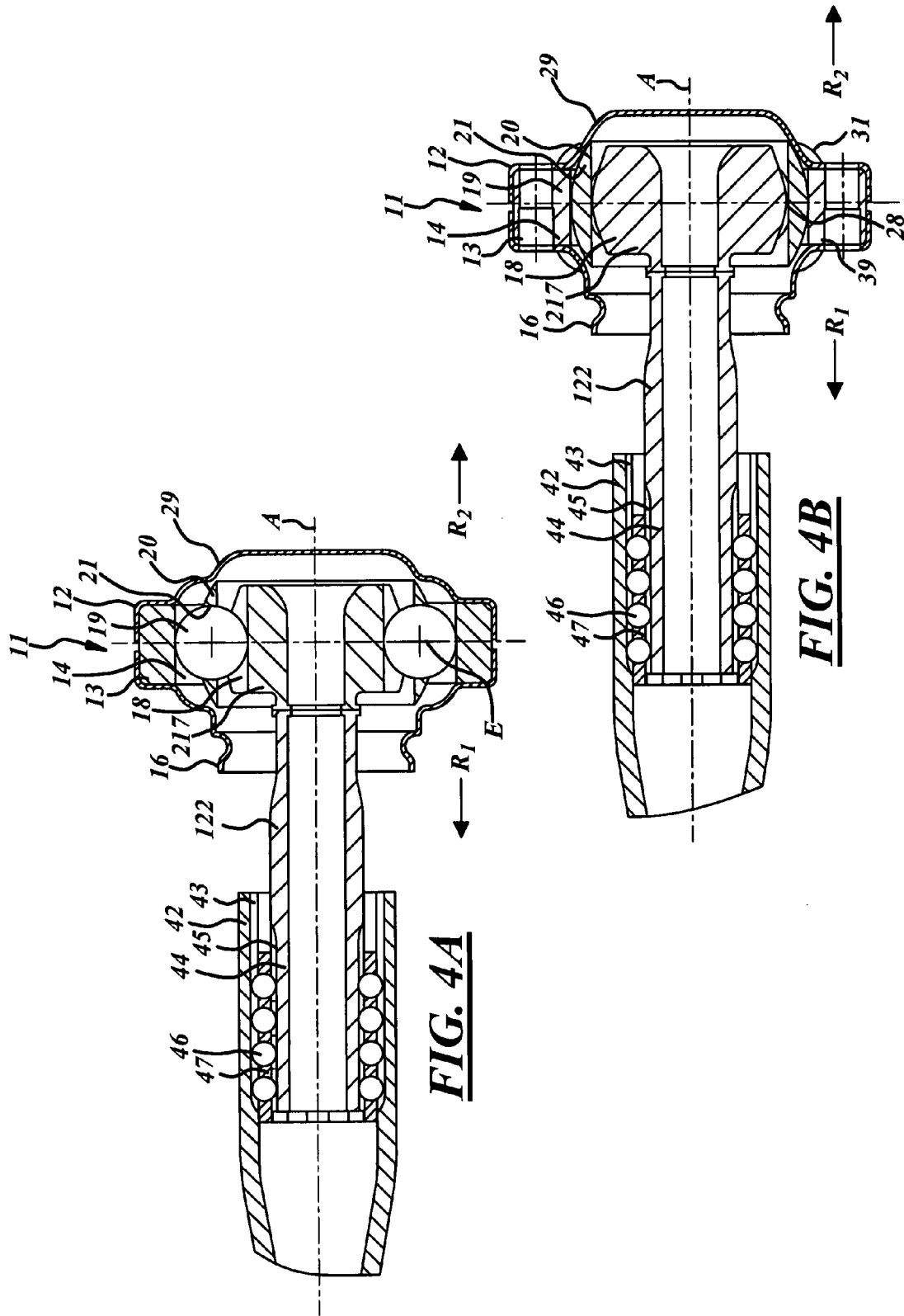
Figure 5A:
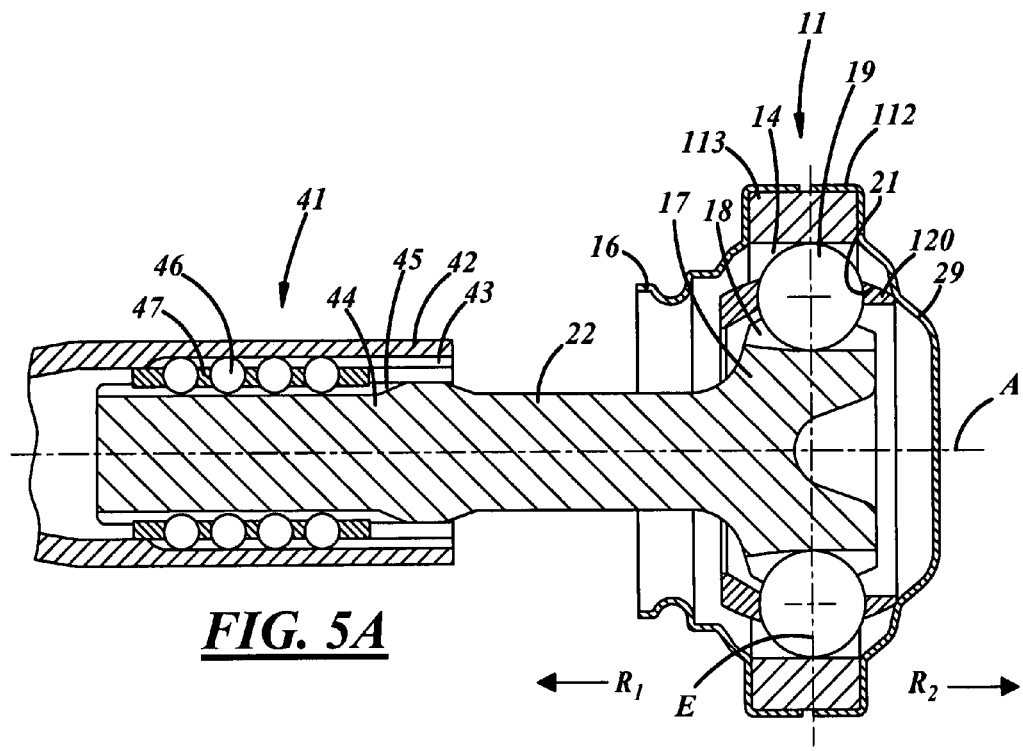
Figure 5B:
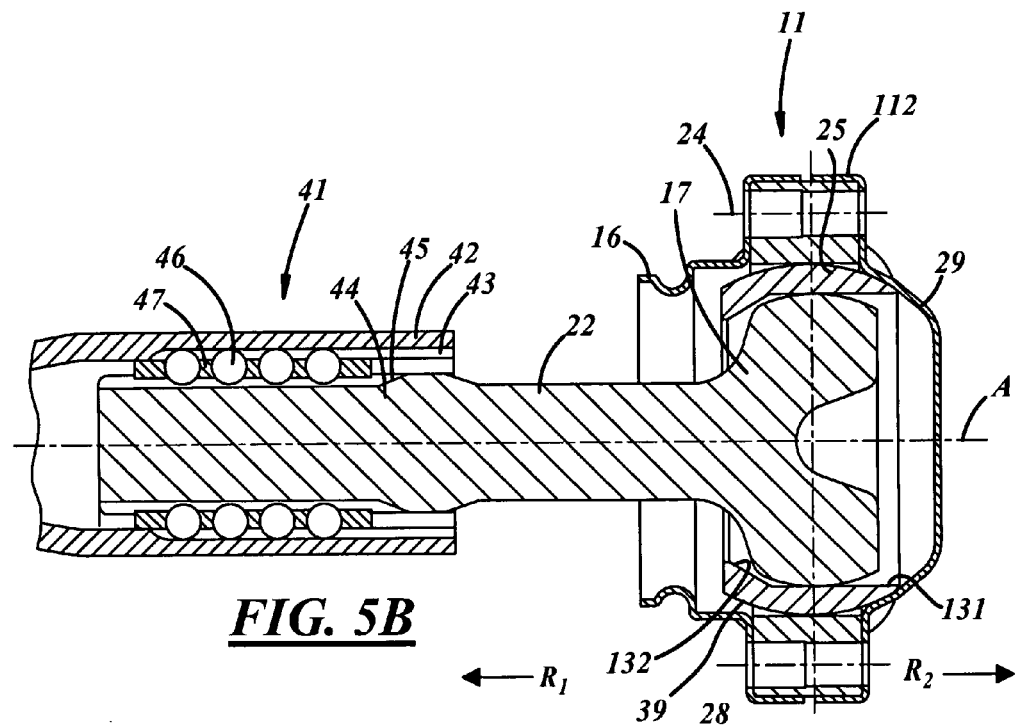
Figure 2C:
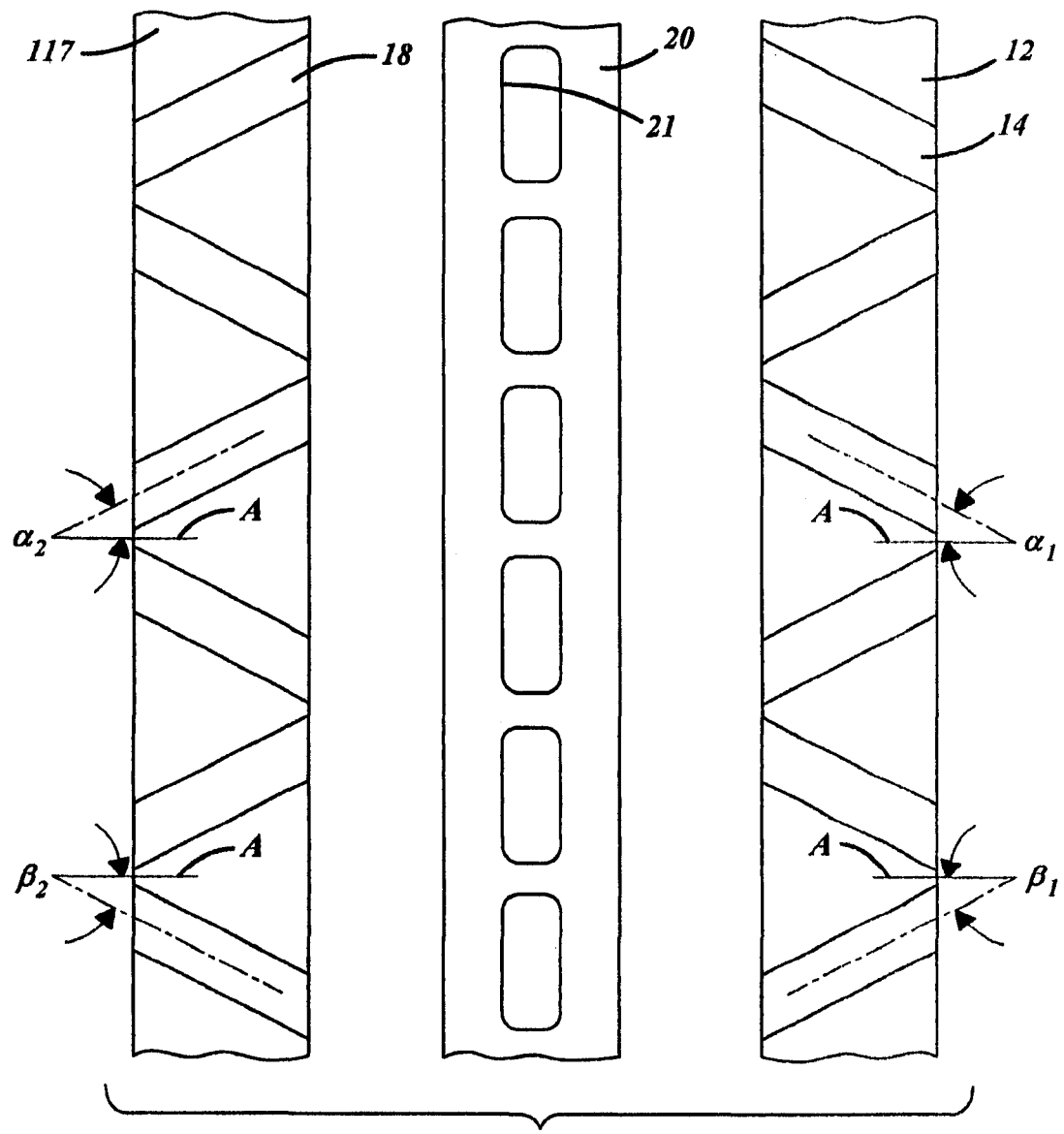
Figure 5A:
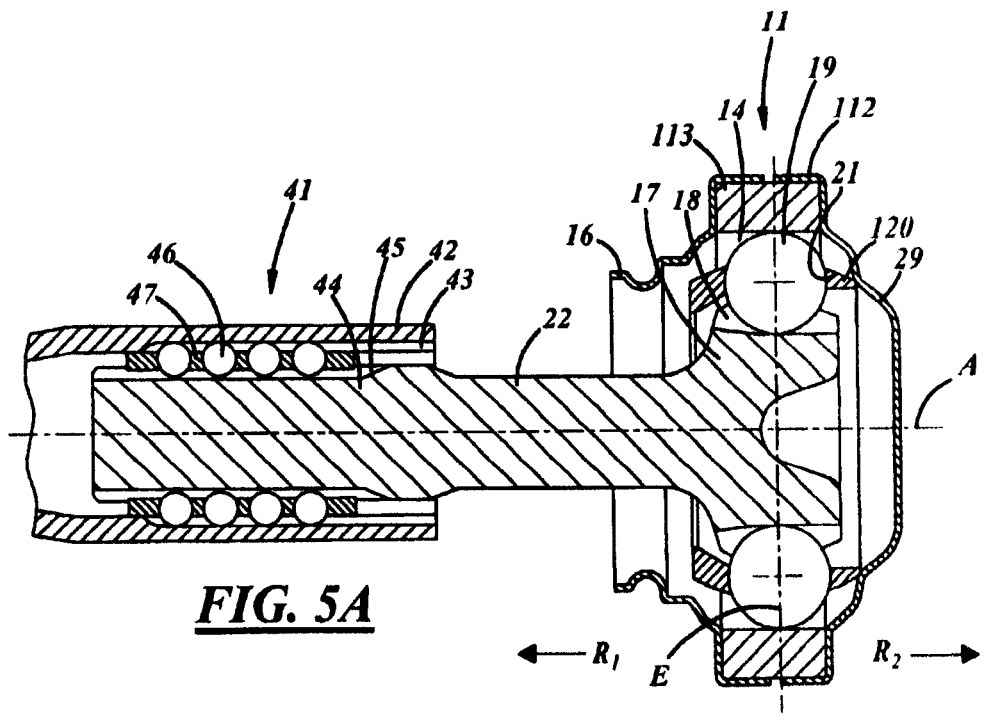
Figure 5B:
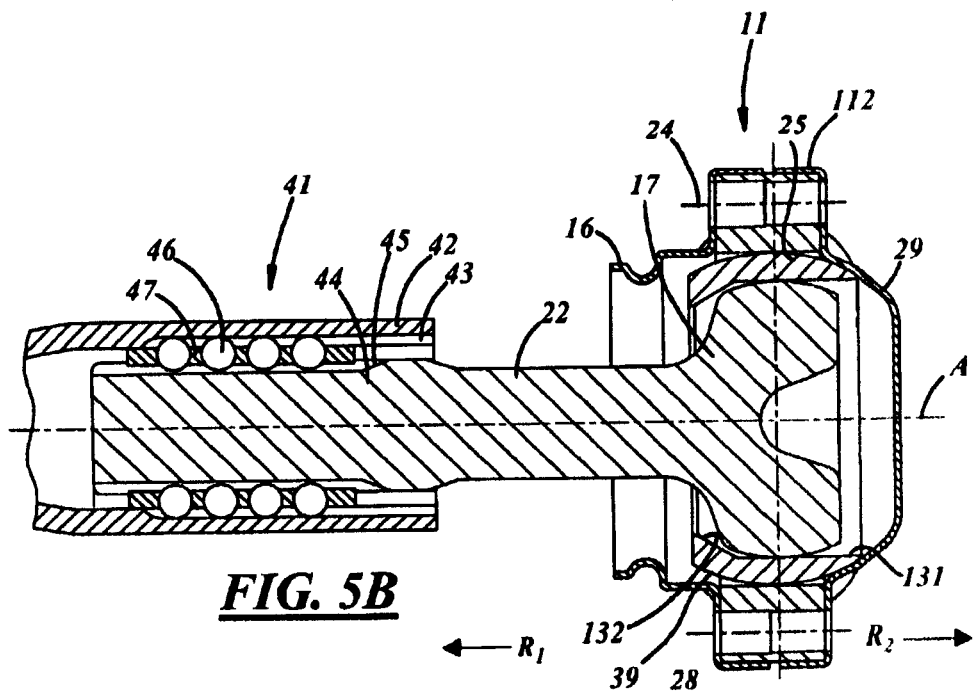
Figure 8A:
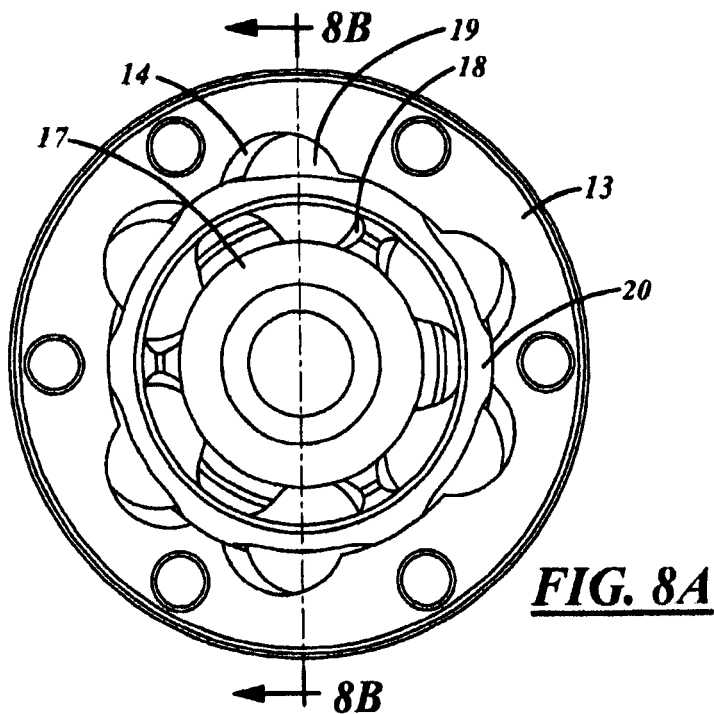
Figure 8B:
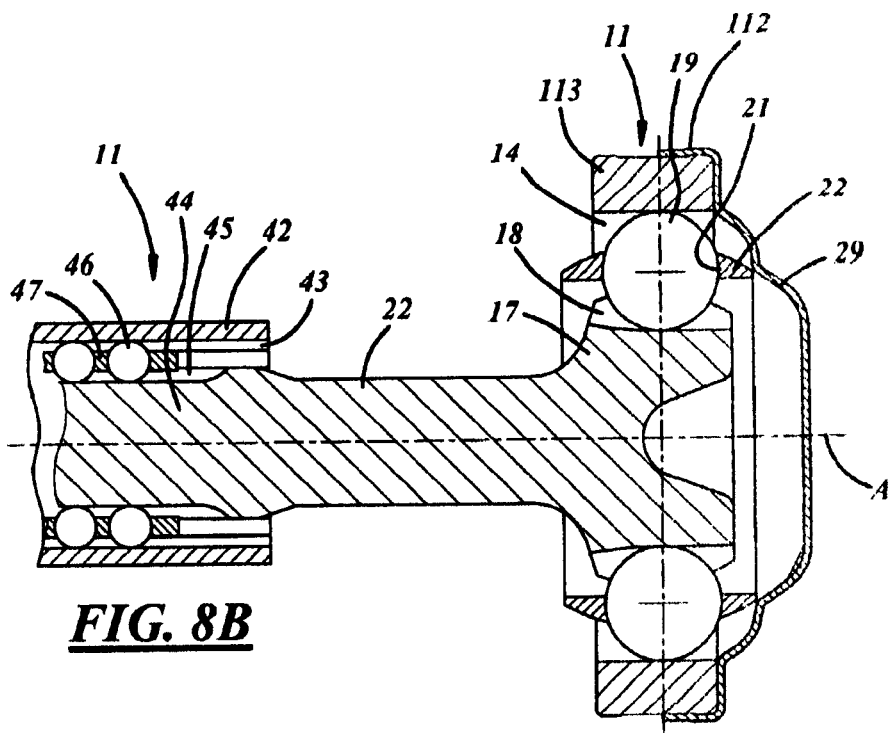

In FIG. 2, any details identical to those shown in FIG. 1 have been given the same reference numbers. To that extent, reference is made to the description of FIG. 1. FIG. 2 deviates from FIG. 1 in that the shaft journal 122 is inserted into the inner joint part 17. In addition, the shaft journal 122 and the journal 44 integrally connected thereto are provided in the form of hollow journals. The journal 44 can be fixed to the inner joint part 117 by, for example, friction welding (FIG. 4). The inner Joint part 117 does not comprise a purely spherical outer face, but an outer face which includes a spherical portion 128 and two conical faces 37, 38.

FIG. 2 also shows the inventive assembly as part of a driveshaft including a second constant velocity joint 5 at the other end of the shaft opposite the constant velocity joint 11. The constant velocity joint 5 can be any known type of constant velocity joint, depending upon the application under consideration.

FIG. 2C schematically illustrates the relationship between the case the outer joint part 12 with first ball tracks 14 forming first angles of intersection α, β, and the inner joint part 117 with second ball tracks 18 forming second angles of intersection $\alpha_2$, $\beta_2$ with the joint axis. The track relationships are the same for each of the embodiments illustrated.

In FIG. 3, any details identical to those in FIG. 1 have been given the same reference numbers. To that extent, reference is made to FIG. 1. The shaft journal 22, just like the journal 22 in FIG. 1, is produced so as to be integrally connected to the inner joint part 17. FIG. 3 deviates from FIG. 1 in that the base part is provided in the form of a plate metal cover 29 in which, however, the second stop face 27 is arranged in the same way as in the embodiment according to FIG. 1. The connection of the outer joint part 112 with an attaching part has to be effected directly via the annular member 113.

In FIG. 4, any details identical to those shown in FIG. 1 have been given the same reference numbers. To that extent, reference is made to the description of FIG. 1. The shaft journal 122 is provided in the form of a hollow journal, as in FIG. 2, but it is attached to the inner joint part 117 via a friction weld 30. The shape of the inner joint part 117 is as described in connection with FIG. 2. The plate metal cover 29 has the shape as already described in connection with FIG. 3. To that extent, reference is made to the respective descriptions.

In FIG. 5, any details identical to those shown in FIG. 1 have been given the same reference numbers. To that extent, reference is made to the description of FIG. 1. The shaft journal 22 and the journal 44 have the same shape as that shown in FIG. 1. The plate metal cover 29 corresponds to the embodiment illustrated in FIGS. 3 and 4. The annular member 113 deviates from the above-mentioned embodiments in that it comprises an inner cylindrical guiding face 25 which only permits radial support for the spherical outer face 28 of the cage 120. Instead, the cage 120 comprises an inner cylindrical guiding face 131 which radially supports the inner joint part 17, as well as an annular stop face 132 on which the inner joint part 17 is radially supported in the first axial direction R1. In addition, as in the preceding embodiments, the cage 120 is supported in the second axial direction R2 on the annular second stop face 27 in the plate metal cover 29.

In FIG. 6, any details identical to those shown in FIG. 1 have been given the same reference numbers. To that extent, reference is made to the description of FIG. 1. In particular, the shaft journal 22 and the journal 44 are designed as shown in FIG. 1. As in the previous FIG. 5, in this case, too, the inner guiding face 25 of the annular member 13 is purely cylindrical and serves only to provide radial guidance for the cage 220. The attaching cap 116 is designed in such a way that it forms the first annular stop face 126 for the cage 220 on which the cage 20 is supported in a first axial direction R1. The base 115 is a solid part and produced so as to be integral with a joint journal 23, but widened on the inside in such a way that it is not in contact with the cage 220. Instead, the cage 220 itself comprises an inner cylindrical guiding face 31 and an annular stop face 133 which axially supports the inner joint part 17 in a second direction R2.

Figures 7A, 7B:
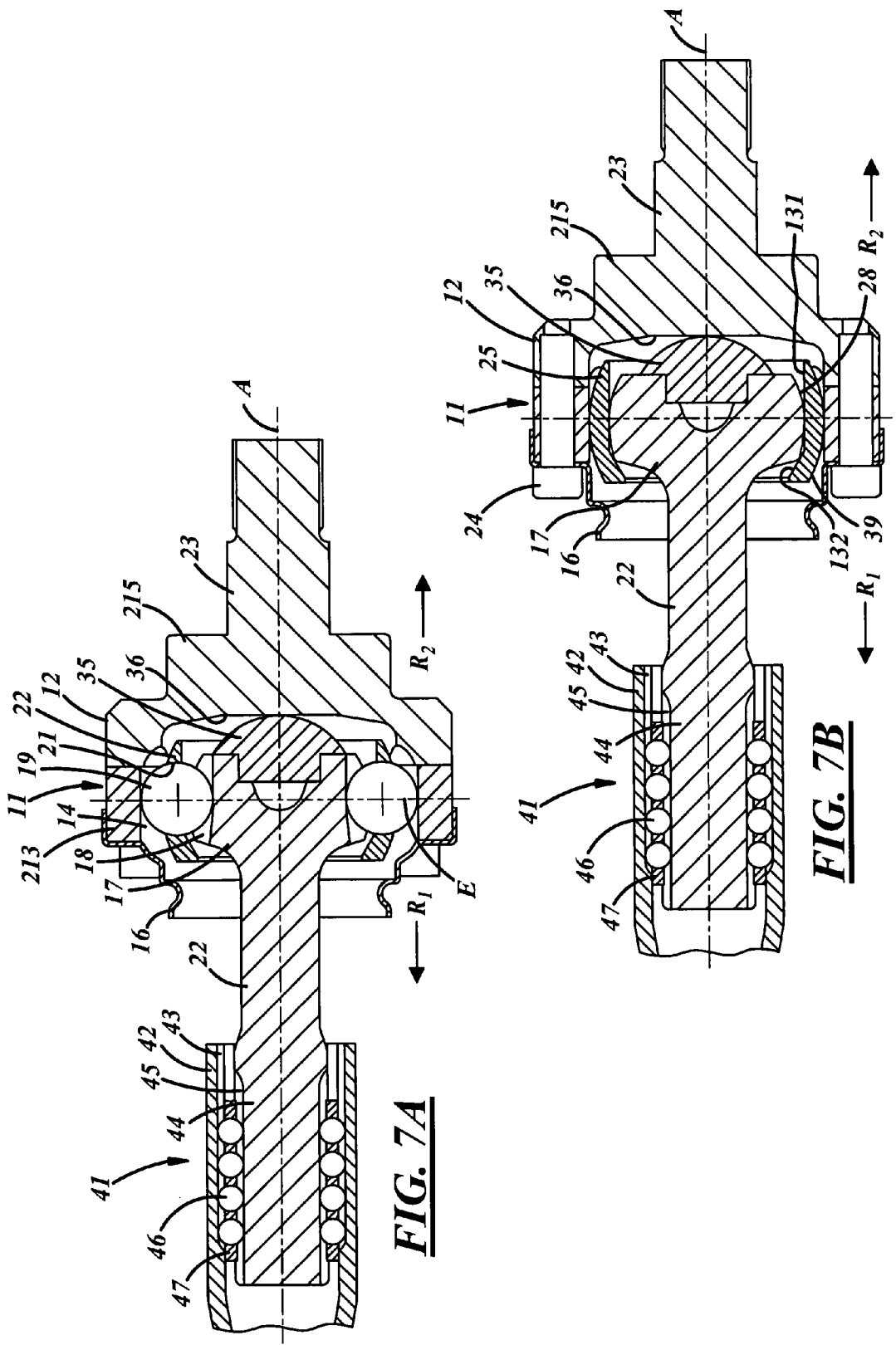
Figure 8A:
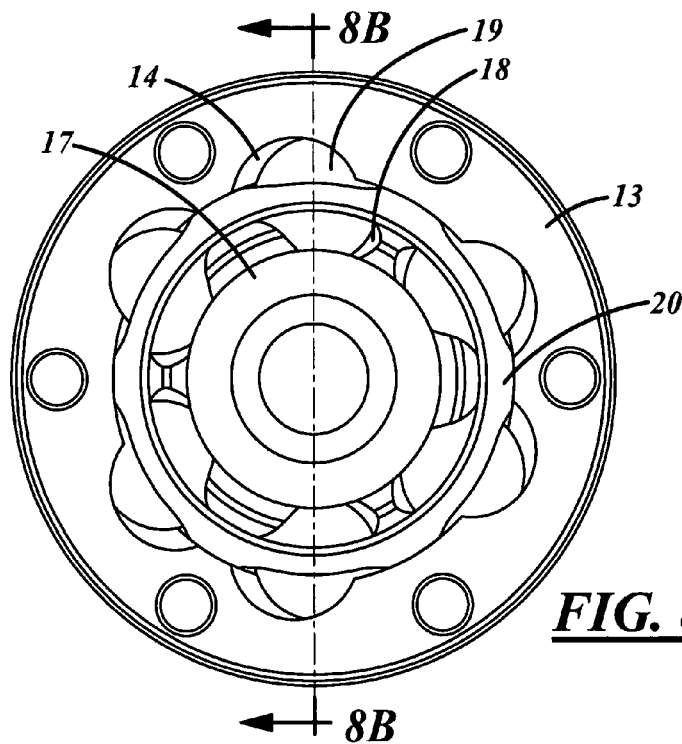
Figure 8B:
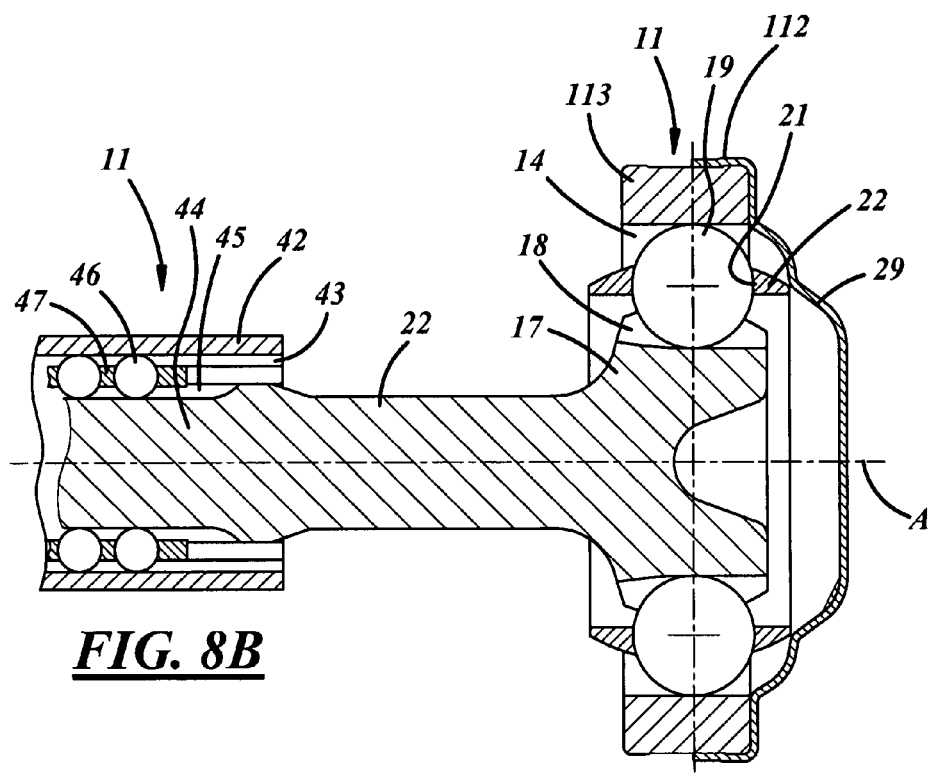

In FIG. 7, any details identical to those shown in FIG. 1 have been given the same reference numbers. To that extent, reference is made to the description of FIG. 1. In particular, the shaft journal 22 is produced so as to be integral with the inner joint part 17 and the journal 44 and designed in the same way as shown in FIG. 1. The annular member 213 comprises an inner purely cylindrical guiding face 25 which supports the cage 120 in the radial direction only. As in FIG. 5, the cage 120 comprises an inner guiding face 131 and an annular stop face 132 which axially supports the inner joint part 17 in the first direction R1. The base 215 which is provided in the form of a solid part and is connected to the joint journal 23 is again widened in such a way that it has no contact with the cage 120, as shown in FIG. 6. A central stop member 35 which is axially supported in the second direction R2 on a stop face 36 in the base is inserted into the inner joint part 17.

In FIG. 8, the front closing cap has been removed, whereas all the remaining details correspond to those of FIG. 3. In the plan view of the annular member 113 it can be seen that the first ball tracks 14 of the outer joint part form alternating first angles of intersection with the joint axis A. In the plan view of the inner joint part 17 it can be seen that the second ball tracks 18 of the inner joint part form alternating second angles of intersection with the joint axis A. First and second ball tracks 14, 18 associated with one another form angles of intersection which are identical in size and which are symmetric relative to the joint axis A. The first and second ball tracks associated with one another accommodate a ball 19. The balls 19 are all held in a cage 20.

While the invention has been described in connection with several embodiments, it should be understood that the invention is not limited to those embodiments. Rather, the invention covers all alternatives, modifications, and equivalents as may be included in the spirit and scope of the appended claims.

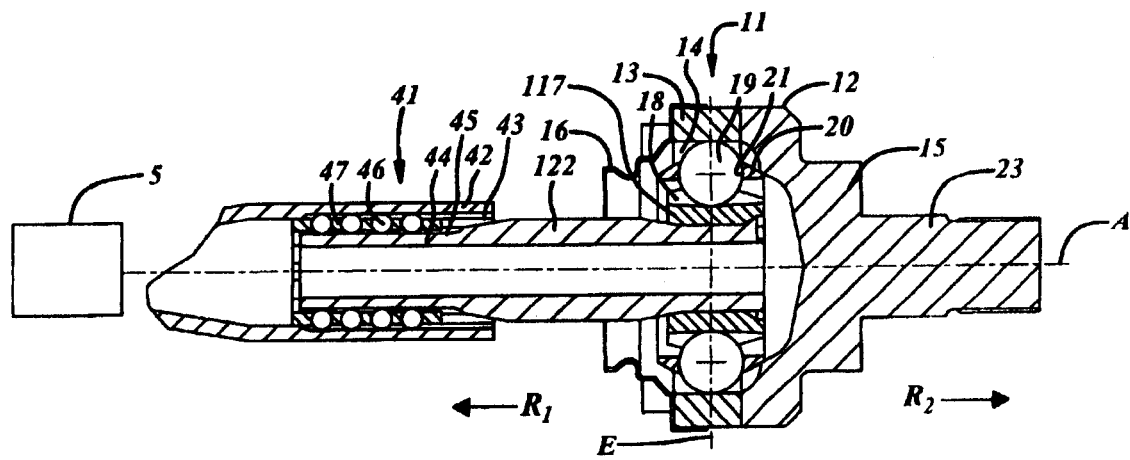

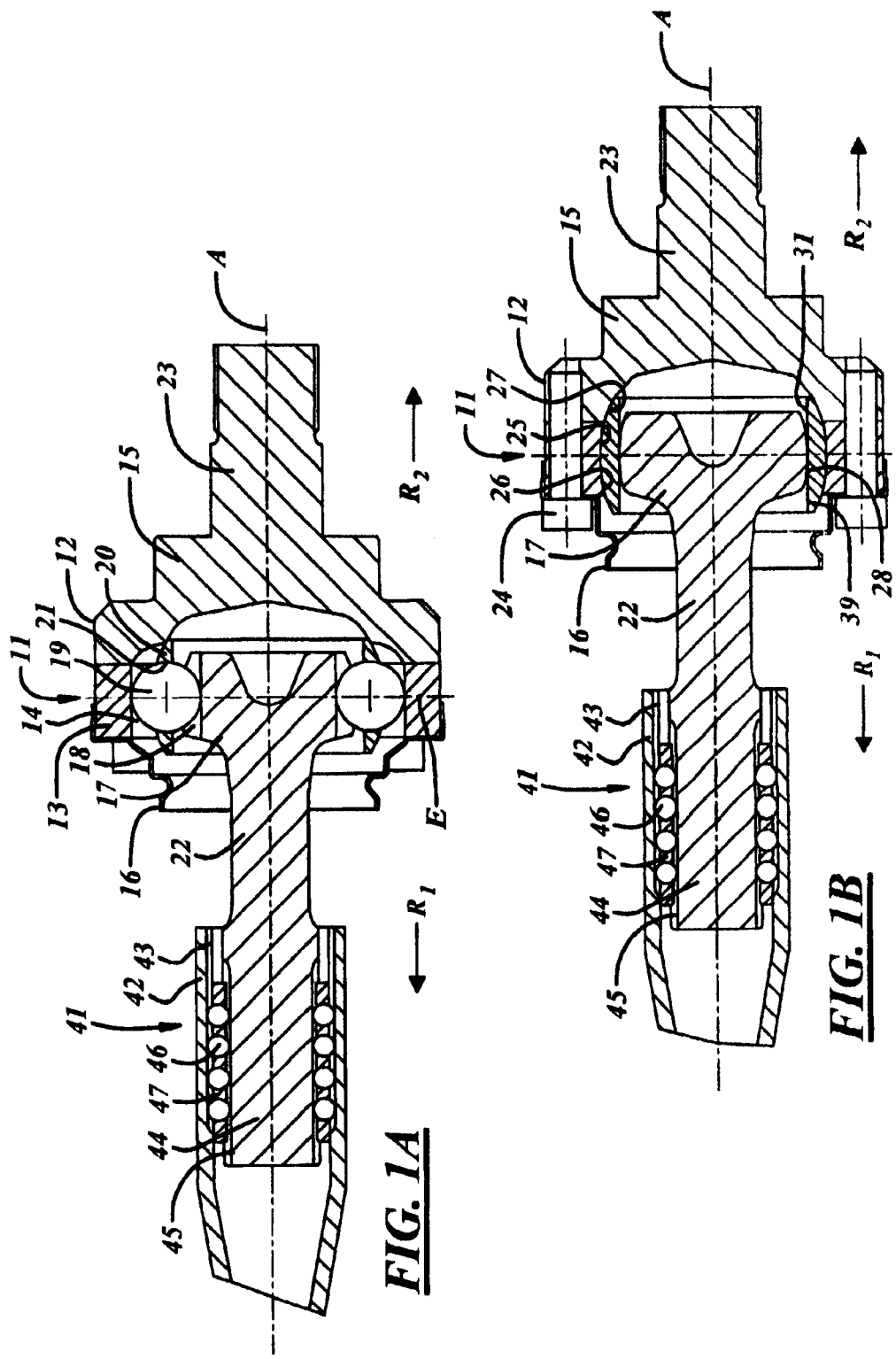

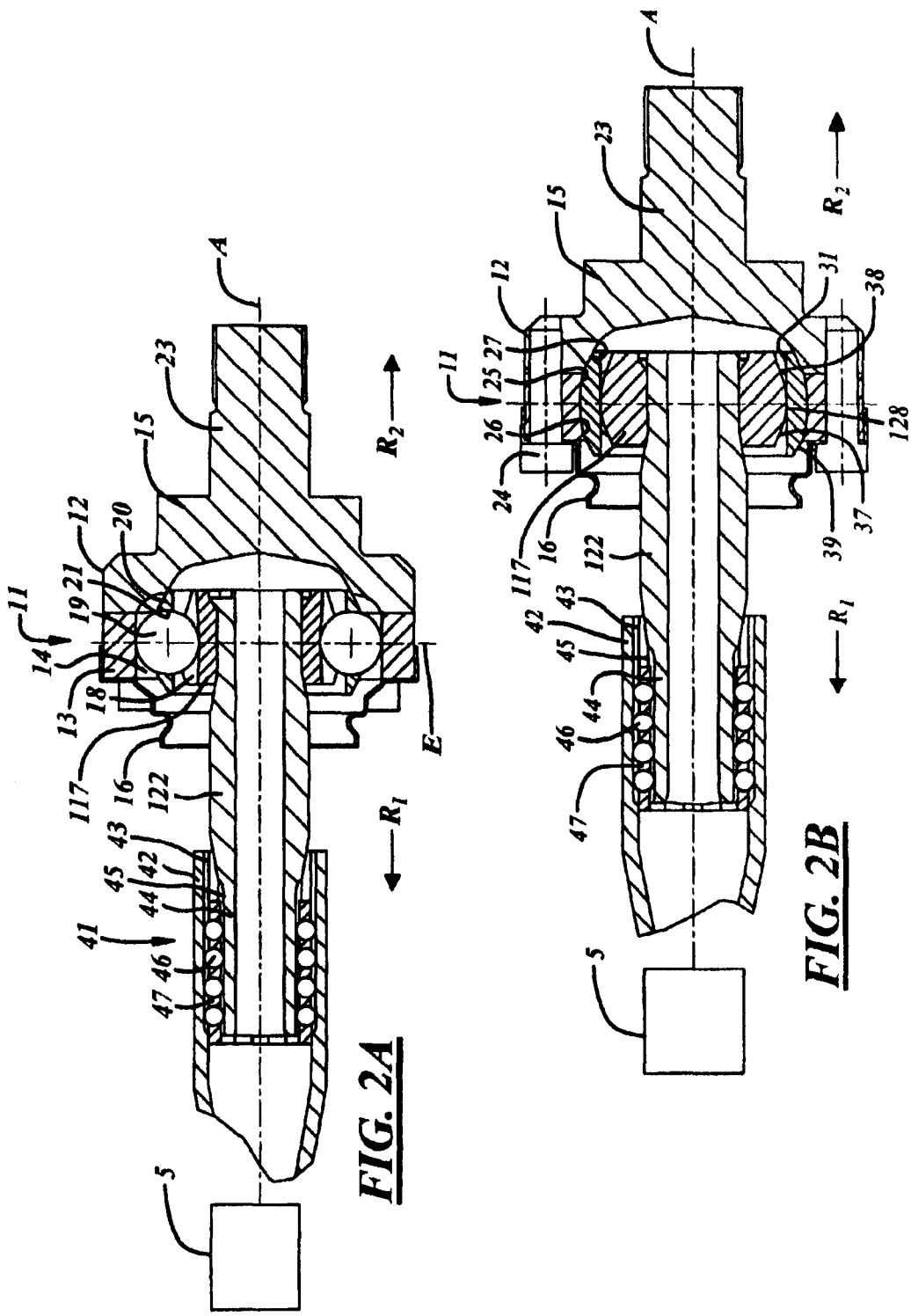

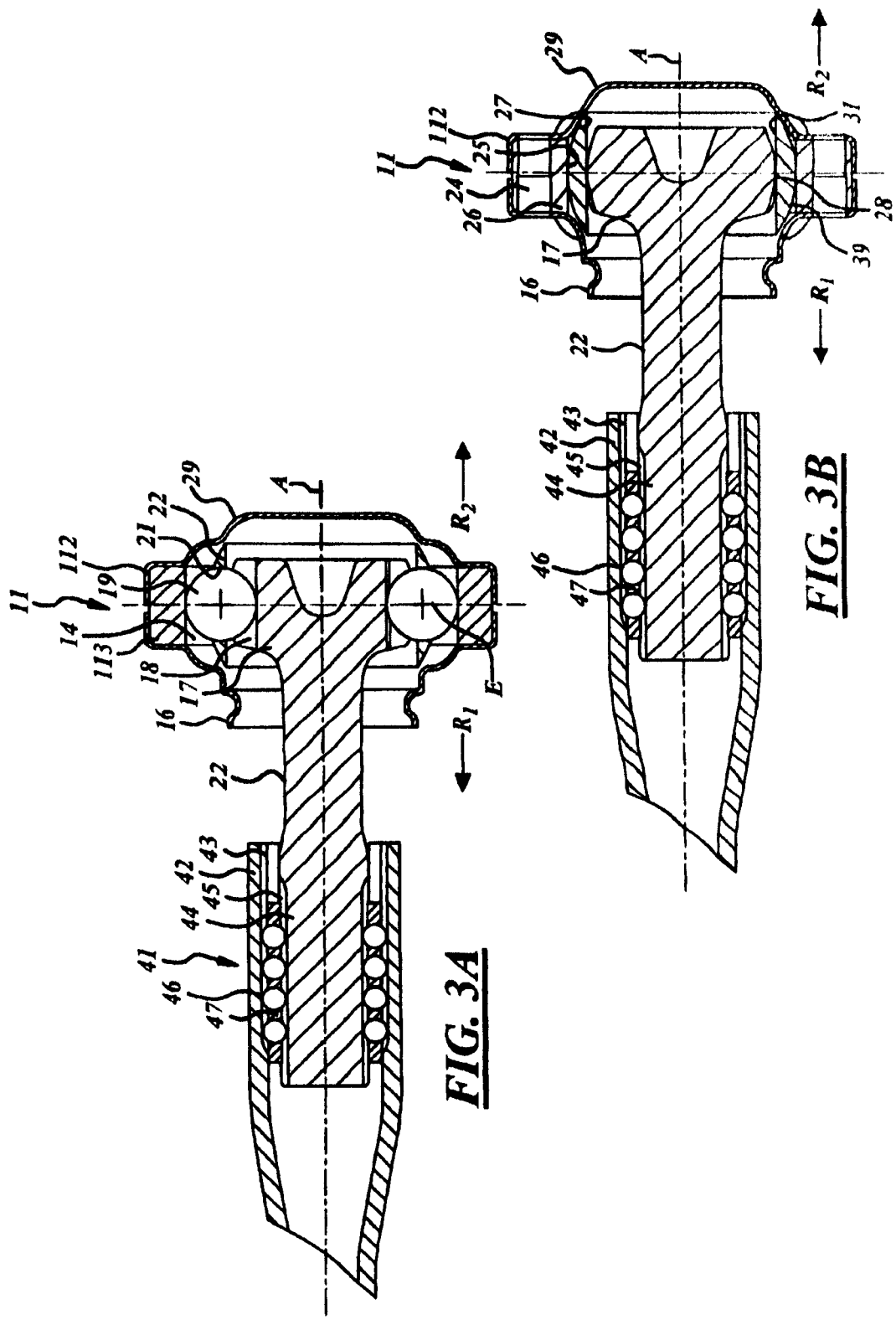

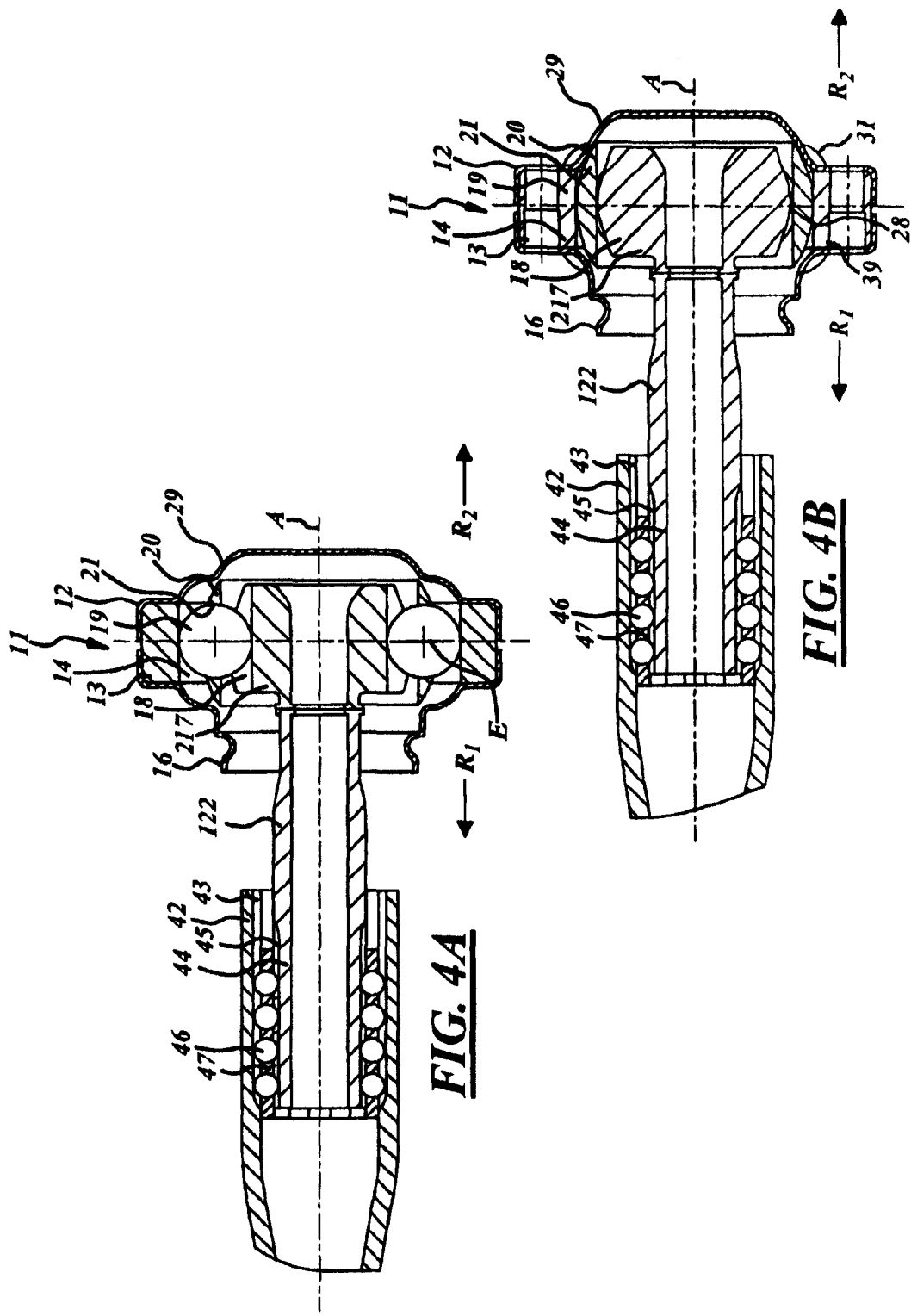

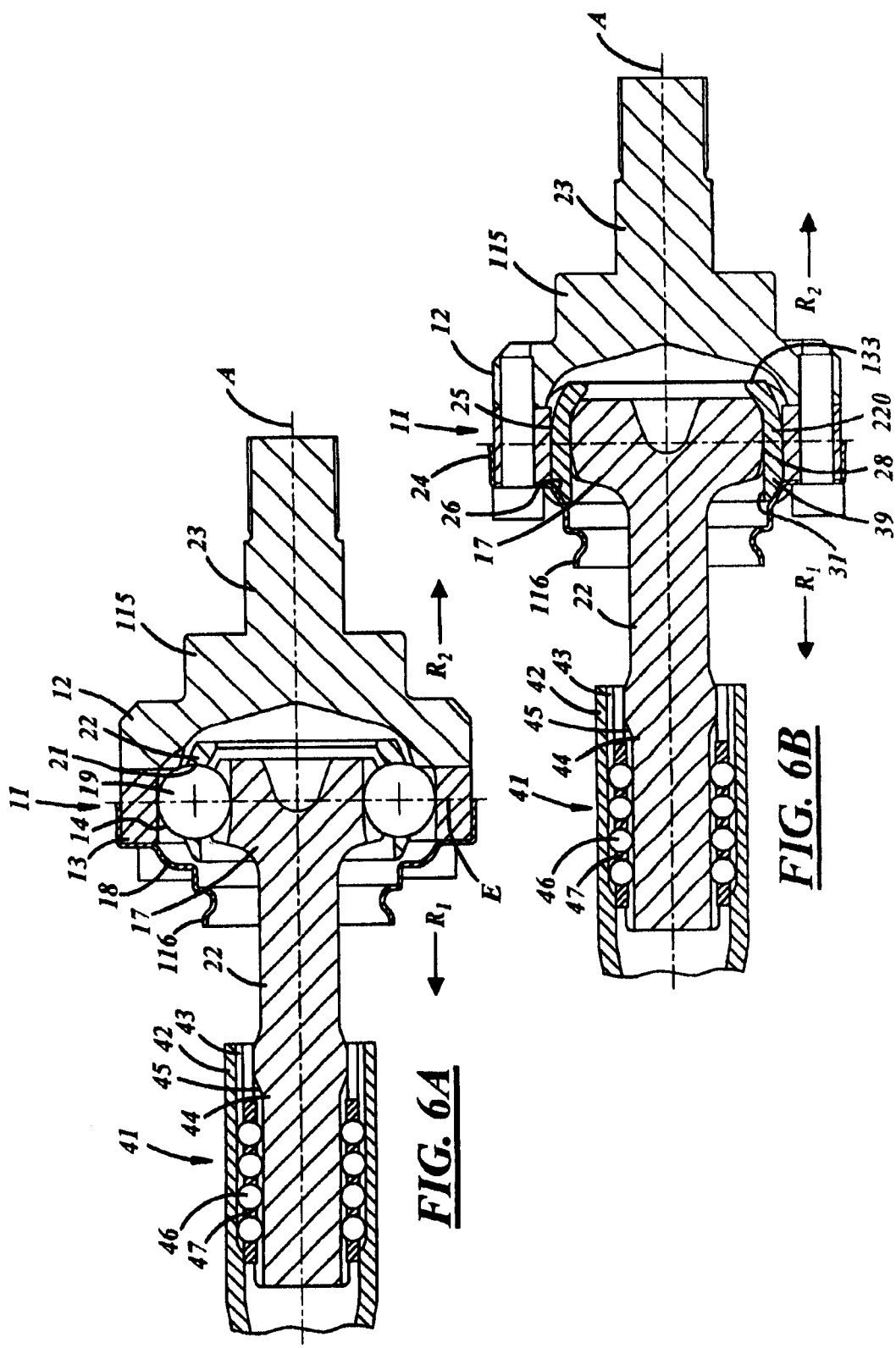

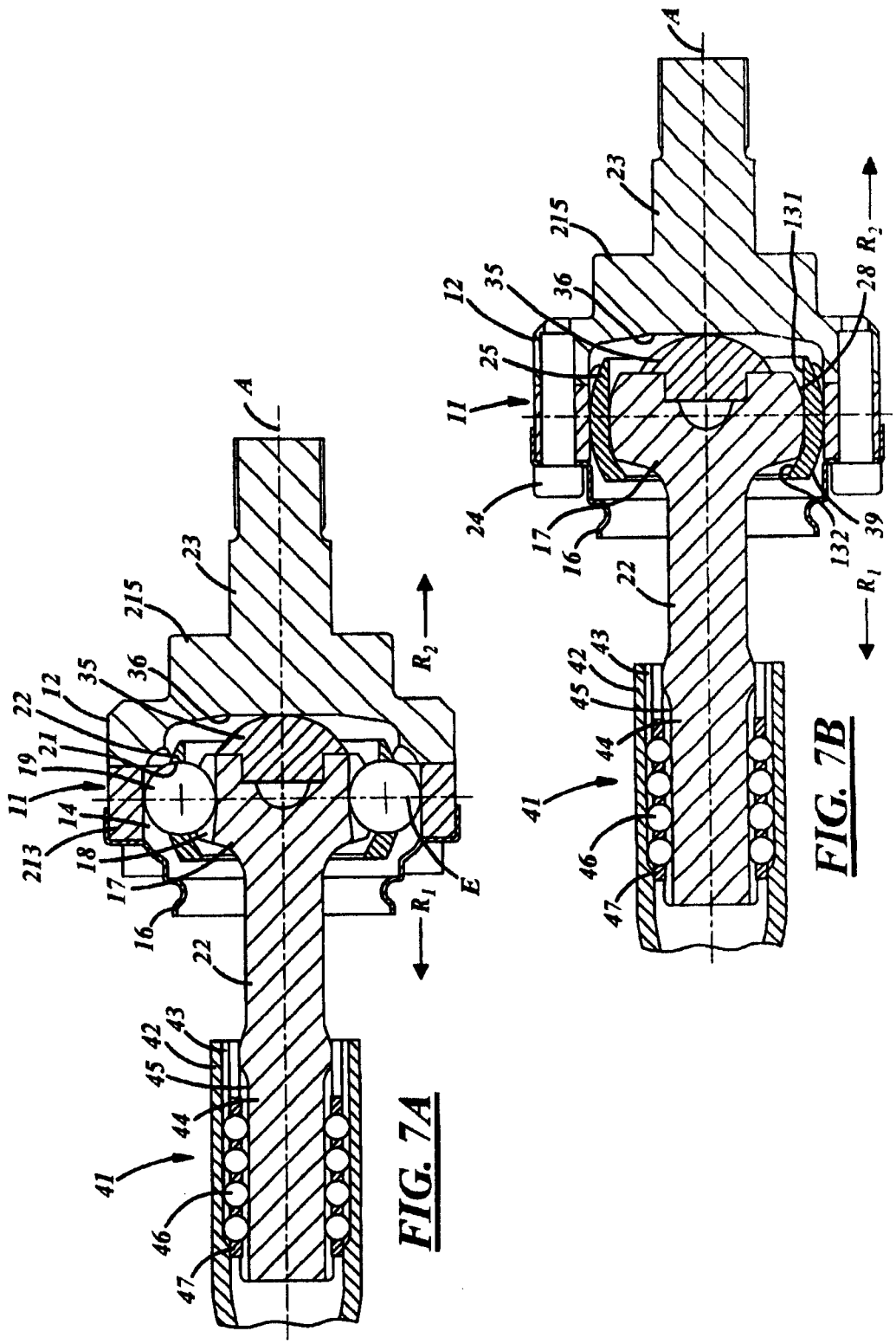

What is claimed is:

1. A driveshaft comprising two constant velocity universal joints and an intermediate shaft;
    one of the constant velocity universal joints comprises an outer joint part with first ball tracks which form first angles of intersection with the joint axis, an inner joint part with second ball tracks which form second angles of intersection with the joint axis, balls which run in pairs of tracks comprising a first ball track and a second ball track, and a first cage which holds the balls in a common plane, wherein the first and second angles of intersection of the ball tracks of a pair of tracks each are identical in size and are positioned symmetrically relative to the joint axis and wherein the first ball cage is axially fixed in the constant velocity joint;
    the intermediate shaft comprises a longitudinal plunging unit having a sleeve with first ball grooves which extend axially, a journal with second ball grooves which extend axially, balls which are held in groups in pairs of grooves each comprising a first ball groove and a second ball groove, and a second cage which holds the balls at a fixed distance from one another, and
    wherein the outer joint part has an inner cylindrical guiding face for supporting an outer face of the first ball cage, and
    wherein the first ball cage comprises an inner cylindrical guiding face, and a spherical outer face which is held axially and radially between first and second annular stop faces of the outer joint part.

2. A driveshaft according to claim 1, wherein the outer joint pan comprises an annular part forming the first stop face and the inner cylindrical guiding face for supporting an outer face of the first ball cage, and a base part in which there is formed the second stop face.

3. A driveshaft according to claim 1, wherein an outer face of the inner joint part comprises a spherical portion and two conical end regions.

4. A driveshaft according to claim 1, wherein the journal is hollow.

5. A driveshaft according to claim 4, wherein the journal is fixed to the inner joint part by friction welding.

* * * * *

UNITED STATES PATENT AND TRADEMARK OFFICE
CERTIFICATE OF CORRECTION

PATENT NO.         : 7,232,373 B2                                          Page 1 of 2
APPLICATION NO.    : 11/482223
DATED              : June 19, 2007
INVENTOR(S)        : Wolfgang Hildebrandt et al.

It is certified that error appears in the above-identified patent and that said Letters Patent is hereby corrected as shown below:

Please add FIG. 2C

In Claim 2, please change [[pan]] to part.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,232,373 B2 Page 1 of 11
APPLICATION NO. : 11/482223
DATED : June 19, 2007
INVENTOR(S) : Wolfgang Hildebrandt et al.

It is certified that error appears in the above-identified patent and that said Letters Patent is hereby corrected as shown below:

Delete the title page and substitute therefore the attached title page showing corrected number of drawing sheets in patent.

Delete Drawing Sheets 1-8 and substitute therefore the attached Drawing Sheets 1-9 including added FIG. 2C.

Column 6, line 17, in Claim 2, please change [[pan]] to part.

This certificate supersedes the Certificate of Correction issued April 6, 2010.

Signed and Sealed this

Twenty-seventh Day of April, 2010

David J. Kappos
*Director of the United States Patent and Trademark Office*

(12) United States Patent
Hildebrandt et al.

(10) Patent No.: US 7,232,373 B2
(45) Date of Patent: Jun. 19, 2007

(54) PLUNGING SIDESHAFT ASSEMBLY WITH JOINT

(75) Inventors: Wolfgang Hildebrandt, Siegburg (DE); Thomas Weckerling, Lohmar (DE); Stephan Maucher, Siegburg (DE); Michael Ricks, Nidderau (DE); Peter Bilz, Freigericht (DE); Kiyoshi Taniyama, Solihull (GB)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 11/482,223

(22) Filed: Jul. 7, 2006

(65) Prior Publication Data
US 2006/0252558 A1 Nov. 9, 2006

Related U.S. Application Data

(63) Continuation of application No. 10/695,058, filed on Oct. 28, 2003, now abandoned.

(30) Foreign Application Priority Data
Oct. 30, 2002 (DE) .................. 102 50 419

(51) Int. Cl.
F16D 3/223 (2006.01)
(52) U.S. Cl. .................. 464/144; 464/167
(58) Field of Classification Search .............. 464/140, 464/144, 167, 906
See application file for complete search history.

(56) References Cited

U.S. PATENT DOCUMENTS

| | | | |
|---|---|---|---|
| 2,322,570 A | * | 6/1943 | Dodge .................. 464/144 |
| 3,370,441 A | * | 2/1968 | Aucktor .................. 464/144 |
| 3,633,382 A | * | 1/1972 | Westercamp .................. 464/144 |
| 4,791,269 A | | 12/1988 | McLean et al. |
| 5,292,285 A | | 3/1994 | Ingalsbe et al. |
| 5,647,800 A | | 7/1997 | Warnke et al. |
| 5,651,738 A | | 7/1997 | Jacob et al. |
| 5,813,917 A | | 9/1998 | Wakamatsu et al. |
| 6,217,456 B1 | | 4/2001 | Jacob |
| 6,306,045 B1 | | 10/2001 | Jacob |
| 6,390,928 B1 | | 5/2002 | Welschof et al. |
| 6,468,164 B2 | | 10/2002 | Song |

FOREIGN PATENT DOCUMENTS

| | | |
|---|---|---|
| DE | 42 28 230 A1 | 3/1993 |
| GB | 2 319 584 A | 5/1998 |

OTHER PUBLICATIONS

GKN Constant Velocity Product Catalog, GKN Automotive Inc., Auburn Hills, MI, pp. 3, 13 & 16, 1993, 464/906

* cited by examiner

Primary Examiner—Greg Binda

(57) ABSTRACT

A driveshaft assembly having two CV joints and an intermediate shaft. One of the CV joints (11) includes an outer joint part (12) with first ball tracks (14), an inner joint part (17) with second ball tracks (18), and balls (19) held in a common plane by a cage (20). First and second angles of intersection of the ball tracks (14, 18) of a pair of tracks are identical in size and are positioned symmetrically relative to the joint axis. The ball cage (20) is axially fixed in the constant velocity joint. The intermediate shaft includes a longitudinal plunging unit (41) having a sleeve (42) with first ball grooves (43) which extend axially, a journal (44) with second ball grooves (45) which extend axially, balls (46) which are held in a cage (47) in groups in pairs of the first and second ball grooves (43, 45)

5 Claims, 9 Drawing Sheets